(12) United States Patent
Mavila et al.

(10) Patent No.: US 11,294,441 B2
(45) Date of Patent: Apr. 5, 2022

(54) SIMPLIFYING POWER SEQUENCING FOR INTEGRATED CIRCUITS

(71) Applicant: NVIDIA CORPORATION, Santa Clara, CA (US)

(72) Inventors: Rajith Mavila, Fremont, CA (US); Venkata Suresh Perumalla, Fremont, CA (US); Kwok San Lee, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 16/912,539

(22) Filed: Jun. 25, 2020

(65) Prior Publication Data

US 2021/0405719 A1    Dec. 30, 2021

(51) Int. Cl.
*G06F 1/26* (2006.01)
*G06F 13/40* (2006.01)
*G06F 11/00* (2006.01)

(52) U.S. Cl.
CPC ............ *G06F 1/266* (2013.01); *G06F 11/004* (2013.01); *G06F 13/4068* (2013.01)

(58) Field of Classification Search
CPC ... G06F 1/24; G06F 1/26; G06F 1/266; G06F 1/32; G06F 1/3203; G06F 1/3206; G06F 1/3278; G06F 1/3287; G06F 13/4068; G06F 11/004
See application file for complete search history.

(56) References Cited

U.S. PATENT DOCUMENTS

| | | | | |
|---|---|---|---|---|
| 6,456,135 | B1 * | 9/2002 | Albean | H04N 5/46 327/198 |
| 7,167,017 | B2 * | 1/2007 | Arora | H03K 19/0016 326/21 |
| 7,982,498 | B1 * | 7/2011 | Chen | H03K 19/0016 326/80 |
| 7,992,024 | B2 * | 8/2011 | Islam | G06F 1/3287 713/323 |
| 8,395,410 | B2 * | 3/2013 | Hatori | H03K 19/0016 326/21 |
| 9,268,901 | B1 * | 2/2016 | Sood | G06F 1/3287 |
| 9,407,264 | B1 * | 8/2016 | Ali | H03K 19/0016 |
| 9,912,335 | B2 * | 3/2018 | Kapoor | G06F 1/3234 |
| 9,973,187 | B1 * | 5/2018 | Pant | H03K 17/223 |
| 10,637,462 | B1 * | 4/2020 | Pulipati | H03K 17/22 |

(Continued)

*Primary Examiner* — Thomas J. Cleary
(74) *Attorney, Agent, or Firm* — Artegis Law Group, LLP

(57) ABSTRACT

In various embodiments, rail decoupling circuits that are powered by an always on voltage rail allow a core voltage rail to power up independently of an I/O voltage rail without jeopardizing I/O pad circuits that are powered by the I/O voltage rail. In an embodiment, when the always on voltage rail is powered-up and a chip reset signal is asserted, the rail decoupling circuits drive control inputs of the I/O pad circuits based on default values. When the chip reset signal is de-asserted, the rail decoupling circuits drive the control inputs of the I/O pad circuits based on signals received from circuits powered by the core voltage rail. Because the rail decoupling circuits maintain control of the I/O pad circuits until the chip-reset is de-asserted, the core voltage rail can power up at any time before the chip-reset signal is de-asserted irrespective of when the I/O voltage rail powers up.

20 Claims, 4 Drawing Sheets

(56) References Cited

U.S. PATENT DOCUMENTS

| | | | |
|---|---|---|---|
| 10,908,667 B2* | 2/2021 | Severino | G06F 1/3234 |
| 10,983,851 B1* | 4/2021 | Djadi | G06F 1/3237 |
| 2005/0064829 A1* | 3/2005 | Kang | H04W 52/028 |
| | | | 455/127.1 |
| 2005/0232053 A1* | 10/2005 | Azuma | G11C 5/147 |
| | | | 365/226 |
| 2009/0153210 A1* | 6/2009 | Wang | G06F 1/32 |
| | | | 327/198 |
| 2010/0042858 A1* | 2/2010 | Padhye | G06F 1/3203 |
| | | | 713/323 |
| 2010/0295595 A1* | 11/2010 | Koutsoures | H03K 19/1731 |
| | | | 327/309 |
| 2011/0276812 A1* | 11/2011 | Lee | G06F 1/26 |
| | | | 713/300 |
| 2012/0068539 A1* | 3/2012 | Shiotani | H03K 19/0016 |
| | | | 307/43 |
| 2012/0187998 A1* | 7/2012 | Jarrar | H03K 19/018521 |
| | | | 327/333 |
| 2012/0275236 A1* | 11/2012 | Hess | G06F 1/3203 |
| | | | 365/189.02 |
| 2013/0140905 A1* | 6/2013 | Huang | G06F 1/26 |
| | | | 307/89 |
| 2013/0238916 A1* | 9/2013 | Dohm | H03K 3/012 |
| | | | 713/320 |
| 2015/0370306 A1* | 12/2015 | Wang | G06F 1/3206 |
| | | | 713/320 |
| 2016/0239060 A1* | 8/2016 | Koob | G06F 1/3287 |
| 2018/0164376 A1* | 6/2018 | Ge | G01R 31/31721 |
| 2018/0316180 A1* | 11/2018 | Batenburg | H02H 3/20 |
| 2019/0288689 A1* | 9/2019 | Jain | H03K 19/00346 |
| 2019/0302876 A1* | 10/2019 | Pant | G06F 1/3206 |

* cited by examiner

SIMPLIFYING POWER SEQUENCING FOR INTEGRATED CIRCUITS

BACKGROUND

Field of the Various Embodiments

The various embodiments relate generally to integrated circuits and, more specifically, to simplifying power sequencing for integrated circuits.

Description of The Related Art

Oftentimes, the circuits in an integrated circuit are partitioned into multiple power domains, where the circuits included in each power domain are powered by a different voltage rail. Each voltage rail can be powered-up to a voltage level that properly powers the associated circuits and, subsequently, can be powered-down to unpower the associated circuits. Two common types of power domains are core power domains and input/output ("I/O") power domains. A core power domain typically includes core circuits used for processing tasks, while an I/O power domain typically includes analog circuits, such as I/O pad circuits that exchange I/O signals with external devices via metal rectangles known as I/O pads.

One challenge associated with integrated circuits that include multiple power domains is that the signals that control the behavior of the I/O pad circuits are usually received from core circuits that are dependent on a core voltage rail. If a properly powered I/O pad circuit is controlled by signals received from an unpowered core circuit, then the I/O pad circuit could transition to an electrically incorrect state and/or cause the associated I/O signal to glitch to an incorrect value. As a result, the reliability and/or functionality of the integrated circuit and/or any number of connected external devices could be degraded. For example, the I/O pad circuit could transition to an electrically incorrect state that causes a type of short circuit known as a "latch-up." A latch-up can reduce the lives of and even destroy portions of the integrated circuit and/or portions of any number of connected external devices.

In an attempt to ensure that powered I/O pad circuits are not controlled by unpowered core circuits, a typical integrated circuit provider establishes any number of "power sequencing requirements" that constrain the order in which the I/O voltage rails are powered-up and powered-down with respect to the core voltage rails. For example, the power sequencing requirements could specify that the core voltage rails must be powered-up before the I/O voltage rails, and that the I/O voltage rails must be powered-down before the core voltage rails. As part of incorporating the integrated circuit into an overall platform, platform designers typically add sequencing circuits that automatically ensure that all power sequencing requirements associated with all voltage rails for all circuits included in the overall platform are met. For overall platforms that adhere to strict functional safety standards (e.g. autonomous driving platforms), platform designers typically also add power sequencing monitoring circuits and power sequencing verification circuits to monitor and verify, respectively, the power sequencing.

One drawback associated with adding power sequencing requirements for an integrated circuit is that the design complexity of each overall platform that includes the integrated circuit is increased. As a result, the amounts of time required to design, analyze, and debug each overall platform are increased. Another drawback is that selecting and configuring the sequencing circuits is often a primarily manual process that can be susceptible to human error when the power sequencing requirements are complex and therefore difficult to understand and/or implement. If the sequencing circuits for an overall platform do not actually ensure that the core voltage rails of the integrated circuit are powered-up whenever the I/O voltage rails are powered-up, then the overall platform can experience the functionality and reliability issues described above.

As the foregoing illustrates, what is needed in the art are more effective techniques for controlling the I/O pad circuits of integrated circuits that include multiple power domains.

SUMMARY

One embodiment of the present invention sets forth a method for controlling input/output ("I/O") pad circuits of an integrated circuit that includes multiple power domains. The method includes in a first power domain included in the multiple power domains, determining that the integrated circuit is associated with a first mode based on a first signal; in response, driving a first control input of a first I/O pad circuit based on a first default control value, where the first I/O pad circuit is included in a second power domain included in the multiple power domains; in the first power domain, determining that the integrated circuit is associated with a second mode instead of the first mode based on a transition of the first signal; and in response, driving the first control input of the first I/O pad circuit based on a first functional control signal instead of the first default control value, where the first functional control signal originates in a third power domain included in the multiple power domains.

At least one technical advantage of the disclosed techniques relative to the prior art is that, with the disclosed techniques, a core voltage rail of an integrated circuit can be powered-up and powered-down independently of an I/O voltage rail without compromising I/O pad circuits that are powered by the I/O voltage rail. In that regard, with the disclosed techniques, because circuits powered by an always on voltage rail provide default values to the control inputs of the I/O pad circuits during power sequencing, the I/O pad circuits operate properly irrespective of the behavior of the core voltage rail. Accordingly, and unlike prior-art techniques, an overall platform that incorporates the integrated circuit does not need to implement power sequencing requirements to ensure that the I/O pad circuits degrade neither the reliability nor the functionality of the integrated circuit during power sequencing. Relative to prior art techniques, the design complexity as well as the amounts of time required to design, analyze, and debug the overall platform can therefore be reduced. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
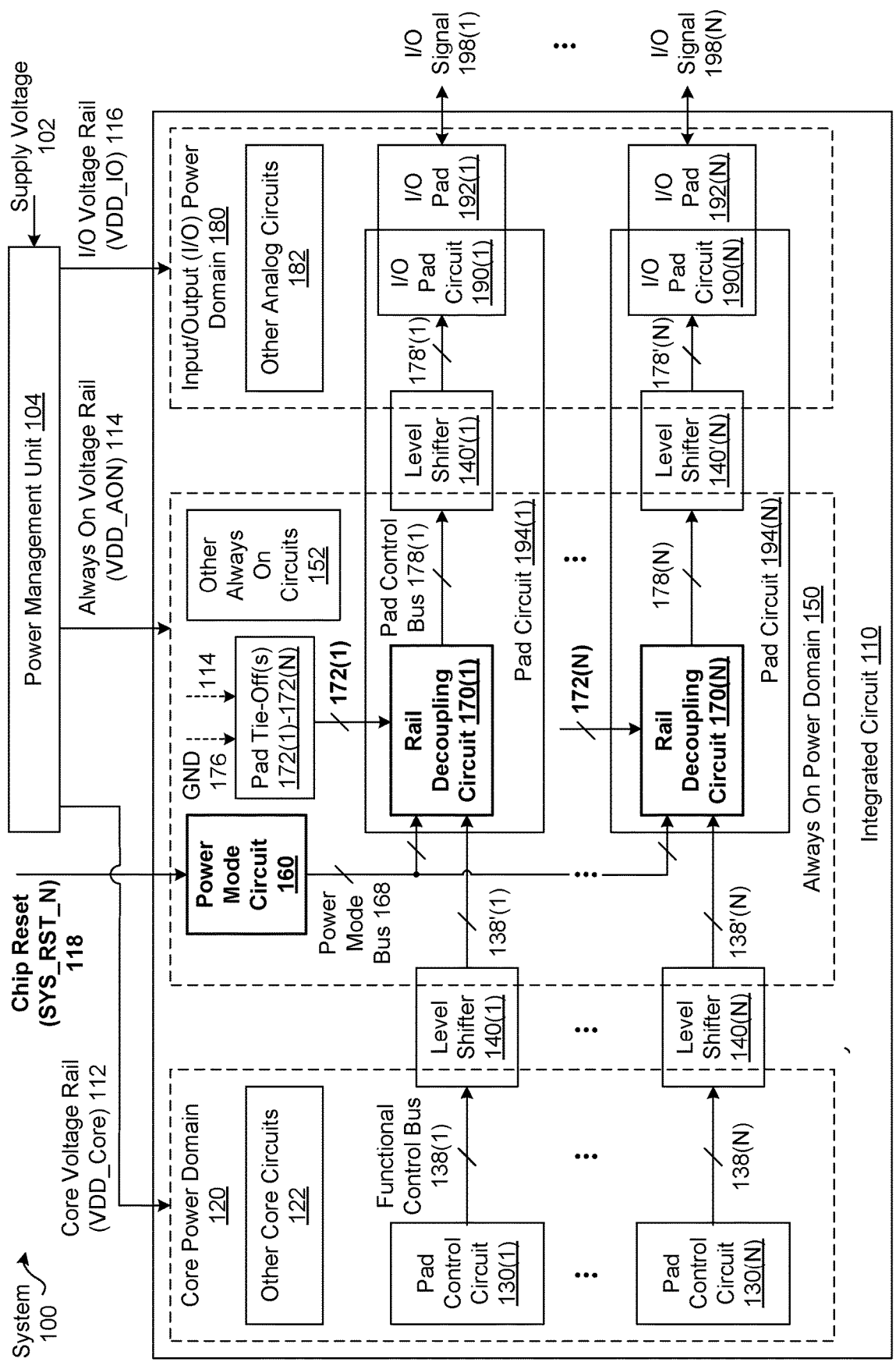
FIG. 1 is a conceptual illustration of a system configured to implement one or more aspects of the various embodiments.

FIG. 1 is a conceptual illustration of a system 100 configured to implement one or more aspects of the various embodiments. For explanatory purposes, multiple instances of like objects are denoted with reference numbers identifying the object and parenthetical alphanumeric character(s) identifying the instance where needed. As used herein, a "bus" refers to one or more signals that are routed together between output(s) of circuit(s) and input(s) of circuit(s). Note that individual signals can be broken-off from a bus. A signal is denoted in FIGS. 1-3 using a line that connects two circuits and a bus is denoted in FIGS. 1-3 using a diagonal slash across a line that connects two circuits.

As shown, the system 100 includes, without limitation, a power management unit 104 and an integrated circuit 110. In some alternate embodiments, the system 100 can include, without limitation, any number of integrated circuits 110 and/or any number of other devices. In the same or other alternate embodiments, the power management unit 104 is included in the integrated circuit 110.

As shown, the power management unit 104 generates a core voltage rail 112, an always on voltage rail 114, and an I/O voltage rail 116 based on a supply voltage 102. The supply voltage 102 can be provided by any type of power source in any technically feasible fashion. Some examples of power sources are batteries, electrical sockets, and power bricks.

The power management unit 104 includes, without limitation, any number and/or types of circuits and executes any number and/or types of operations to generate the core voltage rail 112, the always on voltage rail 114, and the I/O voltage rail 116. In some embodiments, the power management unit 104 includes, without limitation, any amount and/or types of circuits that perform any number of direct current ("DC") to DC conversions. In the same or other embodiments, the power management unit 104 includes, without limitation, any number of voltage regulators. In some alternate embodiments, the power management unit 104 is split across multiple components in the system 100.

A voltage rail can be powered-up to an associated voltage level to power any number and/or types of associated circuits and, subsequently, can be powered-down to unpower the associated circuits. Any number of voltage rails (including zero) can have the same associated voltage level, and any number of voltage rails (including zero) can have different associated voltage levels.

In some alternate embodiments, the power management unit 104 can generate any number and/or types of voltage rails instead of or in addition to any number of the core voltage rail 112, the always on voltage rail 114, and the I/O voltage rail 116. In the same or other alternate embodiments, the power management unit 104 can generate voltage rails for any number and types of integrated circuits 110 and/or any number and type of other devices in any technically feasible fashion.

The integrated circuit 110 is a set of any number and/or types of circuits that are implemented together on a flat piece of semiconductor material known as a "chip." In some embodiments, the integrated circuit 110 is a system on a chip ("SoC") that integrates without limitation, any number and types of central processing units, graphical processing units, memory, I/O circuits, clock circuits, secondary storage, tensor processing units, etc., in any combination. Some other examples of other types of integrated circuits 110 include, without limitation, microcontrollers, microprocessors, digital signal processor, programmable logic devices, etc.

As shown, the integrated circuit 110 incudes, without limitation, a core power domain 120, an always on power domain 150, an I/O power domain 180, and level shifters 140(1)-140(N), where N is an integer greater than zero. In some embodiments, N is equal to the total number of I/O signals 198 that connect the integrated circuit 110 to any number and/or types of external devices.

As referred to herein, a power domain is powered by an associated voltage rail and includes, without limitation, any number and/or types of circuits that are also powered by the associated voltage rail. In some embodiments, the circuits included in any number of power domains can be enabled and/or disabled independently of the circuits included in any number of other power domains.

As shown, the core power domain 120, the always on power domain 150, and the I/O power domain 180 are powered by the core voltage rail 112, the always on voltage rail 114, and the I/O voltage rail 116, respectively. For explanatory purposes only, the core voltage rail 112, the always on voltage rail 114, and the I/O voltage rail 116 are also denoted herein as the "VDD_Core 112," the "VDD_AON 114," and the VDD_IO 116, respectively. The core voltage rail 112, the always on voltage rail 114, and the I/O voltage rail 116 are also collectively referred to herein as the "voltage rails 112,114,116."

In some embodiments, the always on power domain 150 includes, without limitation, any number and/or types of circuits that control a low power state of the integrated circuit 110 that is also referred to herein as a deep power down state. When the integrated circuit 110 is in the deep power down state, the always on power domain 150 remains powered-up and the core power domain 120 is powered-down. Further, the I/O power domain 180 remains powered-up and the states of any number of the circuits in the I/O power domain 180 are retained throughout the deep power down state to reduce the number of reinitialization operations required when the integrated circuit 110 exits the deep power down state. In the same or other embodiments, any number and/or types of connected devices remained powered-up in the low power state and often generate a "wake event" for the system 100 to exit the lower power state.

In some alternate embodiments, the integrated circuit 110 receives and/or generates any number and/or types of other voltage rails in addition to the core voltage rail 112, the always on voltage rail 114, and the I/O voltage rail 116. In the same or other alternate embodiments, the integrated circuit 110 includes, without limitation, any number and/or types of other power domains in addition to the core power domain 120, the always on power domain 150, and the I/O power domain 180.

Note that the techniques described herein are illustrative rather than restrictive and may be altered without departing from the broader spirit and scope of the invention. Many modifications and variations on the functionality provided by the integrated circuit 110 will be apparent to those of ordinary skill in the art without departing from the scope and spirit of the described embodiments. For instance, in some alternate embodiments, the integrated circuit 110 includes, without limitation, more than one core power domain 120, and/or more than one always on power domain 150, and/or more than one I/O power domain 180. In the same or other alternate embodiments, the integrated circuit 110 includes, without limitation, more than one core voltage rail 112, and/or more than one always on voltage rail 114, and/or more than one I/O voltage rail 116.

As shown, the I/O power domain 180 includes, without limitation, I/O pads 192(1)-192(N), portions of pad circuits 194(1)-194(N), and other analog circuits 182. The portions of the pad circuits 194(1)-194(N) that are included in the I/O power domain 180 are powered by the I/O voltage rail 116 and include, without limitation, portions of level shifters 140'(1)-140'(N) and I/O pad circuits 190(1)-190(N). The level shifters 140'(1)-140'(N) are described in greater detail below in conjunction with the always on power domain 150.

For explanatory purposes, the symbol 'x' is used herein to denote any integer from 1 to N. The I/O pad 192(x) is a metal rectangle that is connected to any number and/or types of external devices (e.g., other integrated circuits, a display device, etc.) via the I/O signal 198(x). Any number (including zero) of the I/O pads 192 can be input pads, any number (including zero) of the I/O pads 192 can be output pads, and any number (including zero) of the I/O pads 192 can be bidirectional pads.

The I/O pad circuit 190(x) controls the behavior of the I/O pad 192(x) in any technically feasible fashion. If the I/O pad 192(x) is an input pad, then the I/O pad circuit 190(x) includes, without limitation, any number and/or types of circuits that receive the I/O signal 198(x) from any number and/or types of external devices. If the I/O pad 192(x) is an output pad, then the I/O pad circuit 190(x) includes, without limitation, any number and/or types of circuits that transmit the I/O signal 198(x) to any number and/or types of external devices. If the I/O pad 192(x) is a bidirectional pad, then the I/O pad circuit 190(x) includes, without limitation, any number and/or types of circuits that receive the I/O signal 198(x) from any number and/or types of external devices and any number and/or types of circuits that transmit the I/O signal 198(x) to any number and/or types of external devices.

In some alternate embodiments, any number of the I/O pad circuits 190 can each drive two or more of the I/O pads 192, and the total number of the I/O pad circuits 190 does not necessarily equal the total number of the I/O pads 192. In the same or other alternate embodiments, any number of the I/O pads 192 can each be driven by two or more of the I/O pad circuits 190, and the total number of the I/O pad circuits 190 does not necessarily equal the total number of I/O pads 192. In some alternate embodiments, the total number of the I/O pad circuits 190 does not equal the total number of the pad circuits 194. In the same or other alternate embodiments, the total number of the pad circuits 194 does not equal the total number of the I/O pads 192.

The other analog circuits 182 can include, without limitation, any portions of any amount and/or types of circuits that are powered by the I/O voltage rail 116. Examples of types of circuits that can be powered, at least in part, by the I/O voltage rail 116 include, without limitation, power I/O pads, high speed bricks, fuses, phase-locked loops, delay-locked loops, portions of level shifters, portions of analog to digital converters, etc.

As described in detail previously herein, in many conventional integrated circuits that include multiple power domains, the control inputs of at least some of the I/O pad circuits are received from circuits in the core power domain. If a properly powered I/O pad circuit is controlled based on a signal generated by an unpowered core circuit, then the I/O pad circuit could behave incorrectly. As a result, the reliability and/or functionality of the conventional integrated circuit and/or any number of connected external devices could be degraded.

In a conventional approach to ensuring that powered I/O pad circuits are not controlled by unpowered core circuits, a typical integrated circuit is associated with power sequencing requirements that constrain the orders in which the I/O voltage rail and the core voltage rail can be powered-up and powered-down. One drawback associated with these types of power sequencing requirements is that implementing the power sequencing requirements increases the design complexity and cost of each overall platform that includes the conventional integrated circuit. As a result, the amounts of time required to design, analyze, and debug each overall platform are increased. Another drawback is that the design process for a typical overall platform is susceptible to human error. If the power sequencing requirements are not properly implemented for an overall platform, then the overall platform can experience functionality and reliability issues.

Controlling I/O Pad Circuits from the Always on Power Domain

To address the above problems, and as described in greater detail below, circuits included in the always on power domain 150 are included in the pad circuits 194(1)-194(N) and drive control inputs of the I/O pad circuits 190(1)-190(N) based on default values while a chip reset 118 is asserted. In some embodiments, the chip reset 118 is an external system reset that is asserted during power sequencing. In the same or other embodiments, the chip reset 118 is active low and is also denoted as "SYS_RST_N 118." In some alternate embodiments, the chip reset 118 is internally generated using a power-on-reset ("PoR") circuit that is powered by the always on voltage rail 114. The chip reset 118 can be asserted and de-asserted in any technically feasible fashion. by any number and/or type of external devices. An assertion and a de-assertion of the chip reset 118 can be detected in any technically feasible fashion.

As used herein, "power sequencing" refers to the process of powering up or powering down the voltage rails 112,114, 116 and, therefore, the integrated circuit 110. The chip reset 118 is asserted before any of the voltage rails 112,114,116 are powered-up to start a power up sequence, and the chip reset 118 is de-asserted after all of the voltage rails 112,114, 116 are powered-up to end the power up sequence. The chip reset 118 is asserted before any of the voltage rails 112,114, 116 are powered-down to start a power down sequence. In some embodiments, the chip reset 118 is de-asserted after all of the voltage rails 112,114,116 are powered-down to end the power down sequence. In some alternate embodiments, power sequencing can be delineated in any technically feasible fashion, and the techniques described herein are modified accordingly. In the same or other alternate embodiments, the functionality of the chip reset 118 may be replaced with any number and/or type of signals that are generated internally or externally to the integrated circuit 110.

As shown, the core power domain 120 includes, without limitation, pad control circuits 130(1)-130(N), other core circuits 122, and portions of the level shifters 140(1)-140(N). The pad control circuit 130(x) generates a functional control bus 138(1) that specifies values intended for the control inputs of the I/O pad circuit 190(x). The total number of signals in the functional control bus 138(1) is equal to the total number of control inputs of the I/O pad circuit 190(x).

The other core circuits 122 can include, without limitation, any portions of any amount and/or types of circuits that are powered, at least in part, by the core voltage rail 112. Examples of types of circuits that can be powered, at least in part, by the core voltage rail 112 include, without limitation, central processing units, graphics processing units, hardware accelerators, on-chip interconnects, and so forth. In some embodiments, the core power domain 120 is powered-down when the integrated circuit 110 is in the deep power down state. In such embodiments, the circuits that are included in the other core circuits 122 do not include circuits that are required to operate when the integrated circuit 110 is in the deep power down state.

In some alternate embodiments, any number of the pad control circuits 130 can specify values intended for the control inputs of two or more of the I/O pad circuits 190, and the total number of the pad control circuits 130 does not necessarily equal the total number of the I/O pad circuits 190. In the same or other alternate embodiments, any number of the pad control circuits 130 can each specify values intended for a different subset of the control inputs of any number of the I/O pad circuits 190, and the total number of the pad control circuits 130 does not necessarily equal the total number of the I/O pad circuits 190.

The level shifters 140(1)-140(N) translate voltage levels between the core power domain 120 and the always on power domain 150. More precisely, the level shifter 140(x) translates the functional control bus 138(x) from the core power domain 120 to the always on power domain 150. The output of the level shifter 140(x) is denoted as the functional control bus 138'(x), where the apostrophe before the parenthetical indicates that the voltage levels are associated with the always on power domain 150 instead of the core power domain 120.

As shown, a portion of each of the level shifters 140 is powered by the core voltage rail 112 and is therefore included in the core power domain 120, while a different portion of each of the level shifters 140 is powered by the always on voltage rail 114 and is therefore included in the always on power domain 150. In general, the integrated circuit 110 can include, without limitation, any number and/or types of circuits that are shared between multiple power domains in a similar fashion to the level shifters 140. In particular, the level shifters 140' and the pad circuits 194 are shared between the I/O power domain 180 and the always on power domain 150. In some embodiments, the integrated circuit 110 can include, without limitation, any number and/or types of circuits that are not included in any power domain.

The always on power domain 150 includes, without limitation, a power mode circuit 160, portions of the pad circuits 194(1)-194(N), pad tie-off(s) 172(1)-172(N), and other always on circuits 152. While the always on power domain 150 is powered-up, the power mode circuit 160 determines a mode that is associated with the integrated circuit 110 based on the chip reset 118. In some embodiments, if the chip reset 118 is asserted, then the power mode circuit 160 determines that the integrated circuit 110 is associated with a default mode. If, however, the chip reset is de-asserted, then the power mode circuit 160 determines that the integrated circuit 110 is associated with a functional mode. As shown, the power mode circuit 160 outputs a power mode bus 168 that specifies the mode.

In some alternate embodiments, the power mode circuit 160 and/or any number and/or types of other circuits included in the always on power domain 150 can determine and/or specify the mode associated with the integrated circuit 110 from any number of possible modes in any technically feasible fashion. In some alternate embodiments, at any given time, the power mode circuit 160 can specify, via the power mode bus 168, that the integrated circuit is associated with the default mode, the functional mode, or any number of modes associated with the deep power down state. In the same or other alternate embodiments, the power mode circuit 160 can determine and/or specify via the power mode bus 168, that the integrated circuit 110 is to transition into or out of one of any number of modes in any technically feasible fashion.

The portions of the pad circuits 194(1)-194(N) that are included in the always on power domain 150 are powered by the always on voltage rail 114 and include, without limitation, rail decoupling circuits 170(1)-170(N) and portions of the level shifters 140'(1)-140'(N). As described in greater detail in conjunction with FIG. 2, the rail decoupling circuit 170(x) generates a pad control bus 178(x) based on the power mode bus 168, the functional control bus 138'(x), and the pad tie-off(s) 172(x).

The level shifters 140'(1)-140'(N) translate voltage levels between the always on power domain 150 and the I/O power domain 180. More precisely, the level shifter 140'(x) translates the pad control bus 178(x) from the always on power domain 150 to the I/O power domain 180. The output of the level shifter 140'(x) is denoted as the pad control bus 178'(x) where the apostrophe before the parenthetical indicates that the voltage levels are associated with the I/O power domain 180 instead of the always on power domain 150.

As shown, the pad control bus 178'(x) drives the control inputs of the I/O pad circuit 190(x). If the power mode bus 168 specifies the functional mode, then the rail decoupling circuit 170(x) forwards the functional control bus 138'(x) to the control inputs of the I/O pad circuit 190(x) via the pad control bus 178(x) and the level shifter 140'(x). If, however, the power mode bus 168 specifies the default mode, then the rail decoupling circuit 170(x) provides the values of the pad tie-off(s) 172(x) to the control inputs of the I/O pad circuit 190(x) via the pad control bus 178(x) and the level shifter 140'(x).

The pad tie-off(s) 172(x) specify default values for the control inputs of the I/O pad circuit 190(x). Note that the pad tie-off(s) 172(x) are denoted using both a reference number and a parenthetical to indicate that the pad tie-off(s) 172(x) are customized for the rail decoupling circuit 170(x) that drives the control signal(s) of the I/O pad circuit 190(x). The total number of tie-offs included in the pad tie-off(s) 172(x) is equal to the total number of control inputs of the I/O pad circuit 190(x), where each tie-off is associated with a different control input. Each of the pad tie-offs(s) 172(x) specifies a default value for the associated control input in any technically feasible fashion. In some embodiments, each of the pad tie-off(s) 172(x) is connected to the always on voltage rail 114 or ground ("GND") 176.

The rail decoupling circuits 170(1)-170(N) may generate the pad control buses 178(1)-178(N), respectively, in any technically feasible fashion. In some alternate embodiments, any number and/or types of circuits included in the always on power domain 150 can ensure that valid values are provided to the control inputs of the I/O pad circuits 190 during power up sequences and during power down sequences in any technically feasible fashion. In the same or other alternate embodiments, any number and/or types of circuits included in the always on power domain 150 can provide the values specified via the functional control buses 138 to the control inputs of the I/O pad circuits 190 when the integrated circuit 110 is powered-up in any technically feasible fashion. In some alternate embodiments, the functionality of each of the rail decoupling circuits 170 may vary from the functionality of any number of the other rail decoupling circuits 170. In the same or other alternate embodiments, the functionality of the rail decoupling circuit 170(x) is customized for the I/O pad circuit 190(x).

Figure 3:
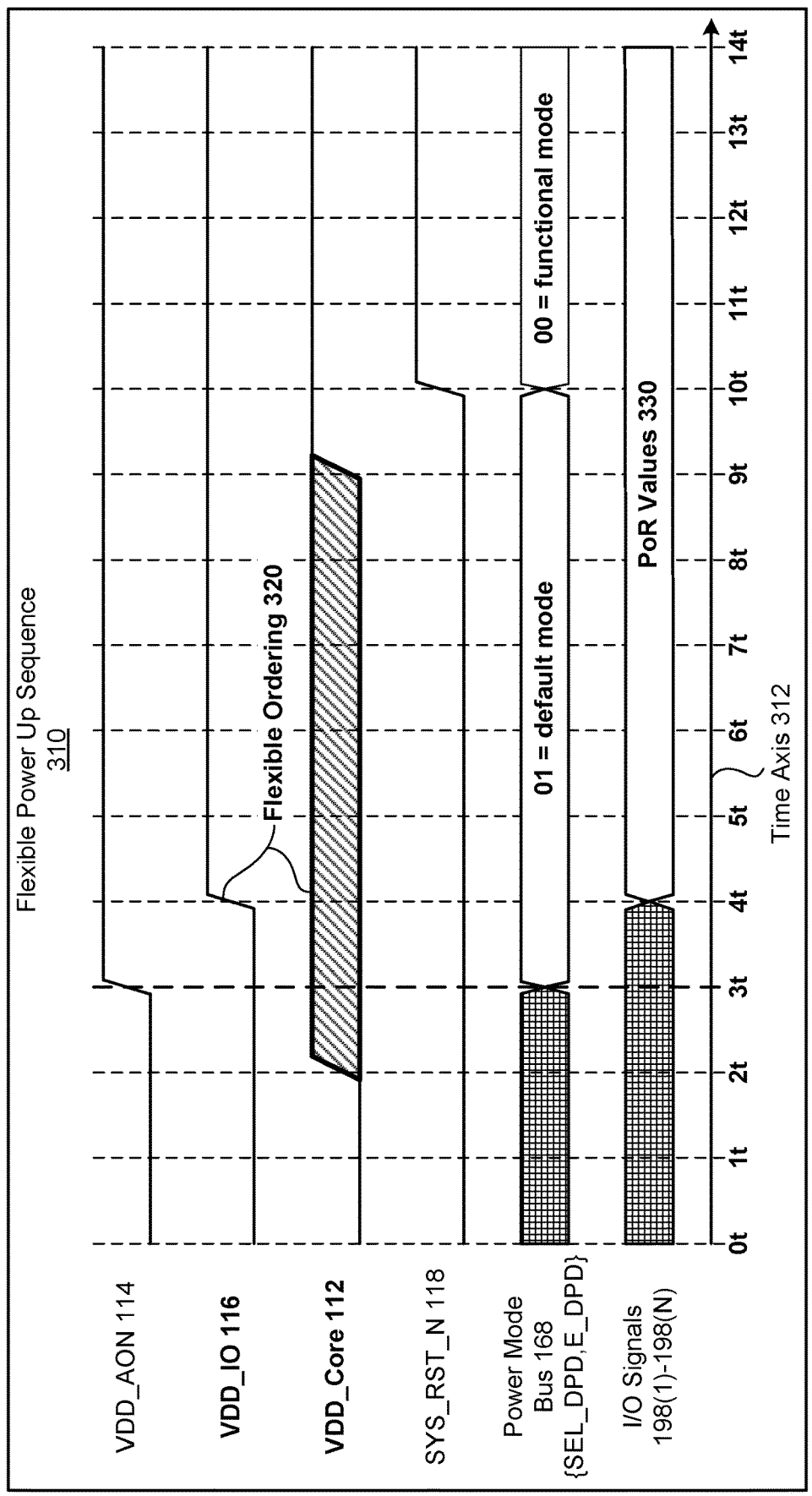
FIG. 3 illustrates an example of a flexible power up sequence for the integrated circuit of FIG. 1, according to various embodiments.

As described in greater detail in conjunction with FIG. 3, during a power up sequence for the integrated circuit 110, the rail decoupling circuits 170(1)-170(N) disregard the functional control buses 138'(1)-138'(N) and provide the values of the pad tie-off(s) 172(1)-172(N) to the control inputs of the I/O pad circuits 190(1)-190(N). Advantageously, because the rail decoupling circuits 170(1)-170(N) isolate the I/O pad circuits 190(1)-190(N) from the pad control circuits 130(1)-130(N) throughout the power up sequence, the core voltage rail 112 can power up at any time during the power up sequence without perturbing the I/O pad circuits 190(1)-190(N). After the power up sequence ends, the rail decoupling circuits 170(1)-170(N) forward the functional control buses 138'(1)-138'(N) to the control inputs of the I/O pad circuits 190(1)-190(N).

During a power down sequence for the integrated circuit 110, the rail decoupling circuits 170(1)-170(N) disregard the functional control buses 138'(1)-138'(N) and provide the values of the pad tie-off(s) 172(1)-172(N) to the control inputs of the I/O pad circuits 190(1)-190(N). Advantageously, because the rail decoupling circuits 170(1)-170(N) isolate the I/O pad circuits 190(1)-190(N) from the pad control circuits 130(1)-130(N) throughout the power down sequence, the core voltage rail 112 can power down at any time during the power down sequence without perturbing the I/O pad circuits 190(1)-190(N).

In some alternate embodiments, any number of the rail decoupling circuits 170 can each drive the control inputs of two or more of I/O pad circuits 190, and the total number of the rail decoupling circuits 170 does not necessarily equal the total number of the I/O pad circuits 190. In the same or other alternate embodiments, any number of the I/O pad circuits 190 can each be driven by two or more of the rail decoupling circuits 170, and the total number of the rail decoupling circuits 170 does not necessarily equal the total number of the I/O pad circuits 190.

The other always on power mode circuits 152 can include, without limitation, any portions of any amount and/or types of circuits that are powered, at least in part, by the always on voltage rail 114. In some alternate embodiments, the always on power domain 150 remains powered-on when the integrated circuit 110 is in a deep power down state. In such embodiments, the always on power domain 150 includes, without limitation, circuits that facilitate any number of the circuits included in the core power domain 120 entering and exiting the deep power down state. In the same or other alternate embodiments, the always on power domain 150 includes, without limitation, any number of circuits that enable any number of the circuits included in the I/O power domain 180 to retain the same states and/or output values while in the deep power down state. In some embodiments, the always on power domain 150 includes, without limitation, any amount and type of circuits that are to remain powered-up irrespective of the mode associated with the integrated circuit 110.

Note that the techniques described herein are illustrative rather than restrictive and may be altered without departing from the broader spirit and scope of the invention. Many modifications and variations on the functionality provided by the power mode circuit 160 and the rail decoupling circuits 170 will be apparent to those of ordinary skill in the art without departing from the scope and spirit of the described embodiments.

It will be appreciated that the system 100 shown herein is illustrative and that variations and modifications are possible. For example, the functionality provided by the power mode circuit 160 and the rail decoupling circuits 170 as described herein can be integrated into or distributed across any number of circuits (including one). Further, the connection topology between the various components in FIG. 1 may be modified as desired.

Figure 2:
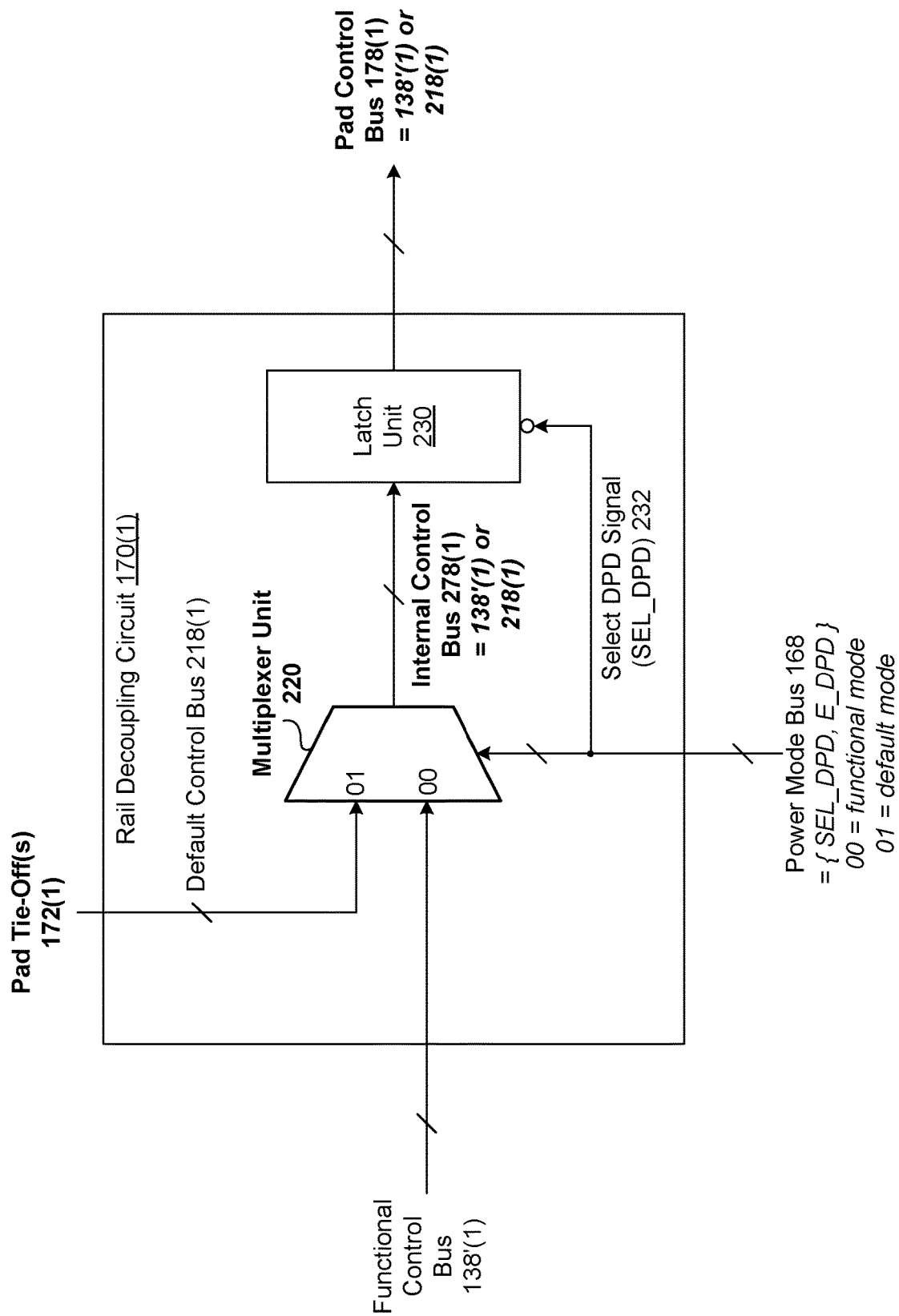
FIG. 2 is a more detailed illustration of the rail decoupling circuit of FIG. 1, according to various embodiments.

FIG. 2 is a more detailed illustration of the rail decoupling circuit 170(1) of FIG. 1, according to various embodiments. Note that the functionality of each of the rail decoupling circuits 170(2)-170(N) of FIG. 1 in regard to the pad control circuits 130(2)-130(N), respectively, and the I/O pad circuits 190(2)-190(N), respectively, is the same as the functionality described herein for the rail decoupling circuit 170(1) in regard to the pad control circuit 130(1) and the I/O pad circuit 190(1).

As shown, the rail decoupling circuit 170(1) includes, without limitation, a multiplexer unit 220 and a latch unit 230. The multiplexer unit 220 and the latch unit 230 are denoted using a reference number without a parenthetical to indicate that the multiplexer unit 220 and the latch unit 230 are not customized for the rail decoupling circuit 170(1) and can be replicated across the rail decoupling circuits 170(2)-170(N). Although not shown, each of the rail decoupling circuits 170(2)-170(N) includes, without limitation, the multiplexer unit 220 and the latch unit 230.

As described previously herein in conjunction with FIG. 1, the total number of tie-offs included in the pad tie-off(s) 172(1) is equal to the total number of control inputs of the I/O pad circuit 190(1), where each tie-off is associated with a different control input. Each of the pad tie-offs(s) 172(1) specifies a default value for the associated control input in any technically feasible fashion. As shown, a default control bus 218(1) provides the default values specified by the pad tie-off(s) 172(1) to the multiplexer unit 220.

In some embodiments, the default values specified by the pad tie-off(s) 172(1) are equal to the values specified by the functional control bus 138'(1) at the power up of the core voltage rail. For example, the functional control bus 138(1) could specify the logical values of bits of a register included in the pad control circuit 130(1), and the pad tie-off(s) 172(1) could specify logical values of the bits at PoR. Consequently, the behavior of the I/O pad circuit 190(1) is consistent from the point-in-time at which the I/O voltage rail 116 powers-up during a power up sequence through the point-in-time at which the chip reset 118 de-asserts and ends the power up sequence.

The multiplexer unit 220 includes, without limitation, any number and/or types of multiplexer(s) (not shown). In some embodiments, the total number of multiplexers included in the multiplexer unit 220 is equal to the total number of control inputs of the I/O pad circuit 190(1), where each multiplexer is associated with a different control input. The multiplexer unit 220 forwards either the functional control bus 138'(1) or the default control bus 218 to the output of the multiplexer unit 220 that drives the internal control bus 278(1) based on the power mode bus 168. If the power mode bus 168 specifies the default mode, then the multiplexer unit 220 forwards the default control bus 218(1) to the output of the multiplexer unit 220. Consequently, the internal control bus 278(1) is the default control bus 218(1). If, however, the power mode bus 168 specifies the functional mode, then the multiplexer unit 220 forwards the functional control bus 138'(1) to the output of the multiplexer unit 220. Consequently, the internal control bus 278(1) is the functional control bus 138'(1).

In some embodiments, and as depicted in FIG. 2, the power mode bus 168 includes, without limitation, an enable deep power down ("DPD") signal (not shown) and a select DPD signal 232. For explanatory purposes only, the select DPD signal is also denoted herein as "SEL_DPD", the enable DPD signal is also denoted herein as "E_DPD", and the power mode bus 168 is also denoted herein as "{SEL_DPD, E_DPD}," As shown, if both the select DPD signal 232 and the enable DPD signal are low, then the integrated circuit 110 is in the functional mode. If, however, the select DPD signal 232 is low and the enable DPD signal is high, then the integrated circuit 110 is in the default mode.

As persons skilled in the art will recognize, when the power mode bus 168 includes two signals, then each of the signals is a different select input of the multiplexer unit 220, and the multiplexer unit 220 can forward any one of four different buses to the outputs. As described previously herein, the power mode bus 168 can specify additional modes that are associated with a deep power down state. Although not depicted in FIG. 2, in some embodiments, if the select deep power down ("DPD") signal 232 is high, then the power mode bus 168 specifies one of two modes that are associated with the deep power down state.

In some alternate embodiments, the multiplexer unit 220 includes, without limitation, a single select input that is driven by the enable DPD signal. If the enable DPD signal is high, then the multiplexer unit 220 forwards the default control bus 218(1) to the output of the multiplexer unit 220, and the internal control bus 278(1) is the default control bus 218(1). If, however, the enable DPD signal is low, then the multiplexer unit 220 forwards the functional control bus 138'(1) to the output of the multiplexer unit 220, and the internal control bus 278(1) is the functional control bus 138'(1).

The latch unit 230 includes, without limitation, any number and/or types of latch(es) (not shown). In some embodiments, the total number of latches included in the latch unit 230 is equal to the total number of control inputs of the I/O pad circuit 190(1), where each latch is associated with a different control input. As shown, the latch unit 230 generates the pad control bus 178(1) based on the internal control bus 278(1) and the select DPD signal 232. The select DPD signal 232 drives an inverted enable input of the latch unit 230. Because the select DPD signal 232 is low for both the default mode and the functional mode, the latch unit 230 transparently forwards the internal control bus 278(1) to the output of the latch unit 230. The pad control bus 178(1) is therefore the internal control bus 278(1) that in turn is either the default control bus 218(1) or the functional control bus 138'(1).

For explanatory purposes only, FIG. 2 does not depict the latching behavior of the latch unit 230 that is enabled when the select DPD signal 232 is high indicating a mode that is associated with the deep power down state. In alternate embodiments, the latch unit 230 and the internal control bus 278(1) are omitted from the rail decoupling circuit 170(1), the output of the multiplexer unit 220 provides the pad control bus 178(1), and any functionality associated with the deep power down state is implemented separately.

Flexible Power Sequencing

FIG. 3 illustrates an example of a flexible power up sequence 310 for the integrated circuit of FIG. 1, according to various embodiments. The flexible power up sequence 310 is depicted via a timing diagram in which time increases from left to right from 0t to 14t, where t is any amount of time, in the horizontal direction along a time axis 312. At different vertical positions from top to bottom, the flexible power up sequence 310 depicts the always on voltage rail 114, the I/O voltage rail 116, the core voltage rail 112, the chip reset 118 that is active low, the power mode bus 168, and the I/O signals 198(1)-198(N). For explanatory purposes only, propagation delays between various signals are considered to be zero. Further, although each transition is depicted as a diagonal line, the associated rail, signal, or bus is considered to transition immediately, and the center of the diagonal line in the horizontal direction denotes the time of the transition.

As shown, for the period of time from 0t to 2t, the always on voltage rail 114, the I/O voltage rail 116, and the core voltage rail 112 are powered-down; and the chip reset 118 is de-asserted. As depicted with grid patterns, because the always on voltage rail 114 and the I/O voltage rail 116 are powered-down, the values of the power mode bus 168 and the I/O signals 198(1)-198(N) are unknown. Importantly, there is a flexible ordering 320 between the core voltage rail 112 and the I/O voltage rail 116. In some embodiments, the core voltage rail 112 can power up at any time before the chip reset 118 is de-asserted. A diagonal pattern depicts an exemplary interval of time from 2t to 9t during which the core voltage rail 112 can power up.

At the time of 3$t$, the always on voltage rail 114 powers up and, in response, the power mode circuit 160 specifies the default mode via the power mode bus 168.

Referring back to FIG. 1, because the chip reset 118 is de-asserted, the rail decoupling circuits 170(1)-170(N) provide the default control buses 218(1)-218(N) respectively, to the control inputs of the I/O pad circuits 190(1)-190(N), respectively. For explanatory purposes only, the pad tie-offs 210(1)-210(N) set the values of the default control buses 218(1)-218(N), respectively, equal to the default values of the functional control buses 138'(1)-138'(N), respectively, at the power up of the core voltage rail 112.

At the time of 4$t$, the I/O voltage rail 116 powers up. As a result, the default control buses 218(1)-218(N) cause the I/O pad circuits 190(1)-190(N), respectively, to transition the I/O signals 198(1)-198(N), respectively, from unknown values to PoR values 330. In some embodiments, the PoR values 330 are the default values of the functional control buses 138'(1)-138'(N), respectively, at the power up of the core voltage rail 112. Regardless of when the core voltage rail 112 powers up, the rail decoupling circuits 170(1)-170(N) continue to provide the default control buses 218(1)-218(N), respectively, to the control inputs of the I/O pad circuit 190(1) until the chip reset 118 is de-asserted.

When the time is 10t, the chip reset 118 is de-asserted. In response, the power mode circuit 160 specifies the functional mode via the power mode bus 168, and the rail decoupling circuits 170(1)-170(N) provide the functional control buses 138'(1)-138'(N), respectively, to the control inputs of the I/O pad circuit 190(1)-190(N), respectively. Because the values of the functional control buses 138'(1)-138'(N) are equal to the values of the default control buses 218(1)-218(N), respectively, the behavior of the I/O pad circuits 190(1)-190(N), respectively, are unchanged. Therefore, the I/O signals 198(1)-198(N) remain at the PoR values 330.

Although not depicted, in a flexible power down sequence, the chip reset 118 is re-asserted while the always on voltage rail 114, the I/O voltage rail 116, and the core voltage rail 112 are powered-up. In response, the power mode circuit 160 specifies the default mode via the power mode bus 168, and the rail decoupling circuits 170(1)-170(N) provide the default control buses 218(1)-218(N), respectively, to the control inputs of the I/O pad circuits 190(1)-190(N), respectively. The default control buses 218(1)-218(N) cause the I/O signals 198(1)-198(N), respectively, to stay at or transition to the PoR values 330. The core voltage rail 112 can then be powered-down in any order with respect to the I/O voltage rail 116 without perturbing the behaviors of the I/O pad circuits 190(1)-190(N).

Figure 4:
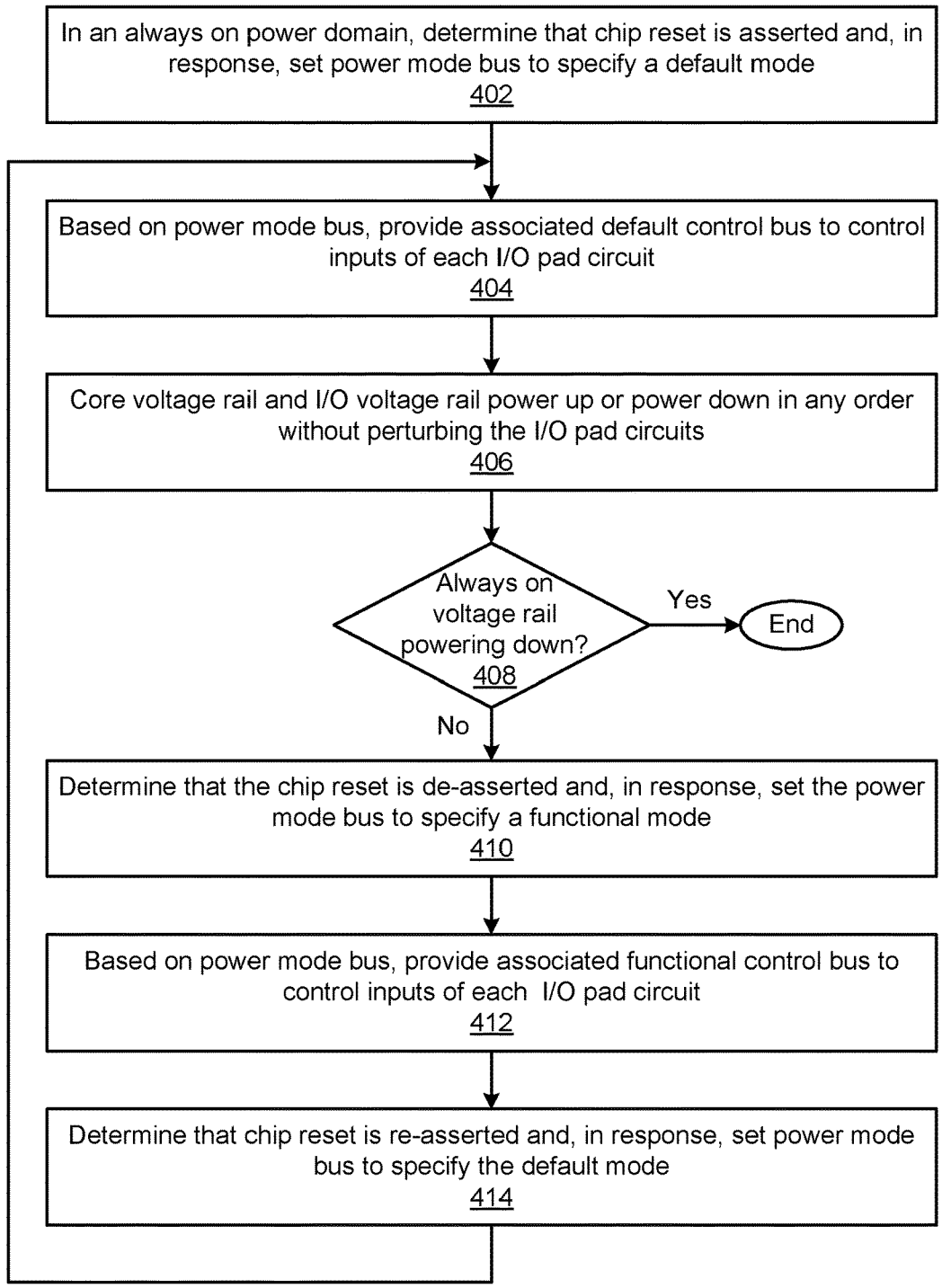
FIG. 4 is a flow diagram of method steps for controlling input/output (I/O) pad circuits of an integrated circuit that includes multiple power domains, according to various embodiments.

FIG. 4 is a flow diagram of method steps for controlling pad circuits of an integrated circuit having multiple power domains, according to various embodiments. Although the method steps are described with reference to the systems of FIGS. 1-2, persons skilled in the art will understand that any system configured to implement the method steps, in any order, falls within the scope of the present invention.

As shown, a method 400 begins a step 402, where, in the always on power domain 150, the power mode circuit 160 determines that the chip reset 118 is asserted and, in response, sets the power mode bus 168 to specify a default mode. At step 404, based on the power mode bus 168, the rail decoupling circuits 170(1)-170(N) provide the default control buses 218(1)-218(N), respectively to the control inputs of the I/O pad circuits 190(1)-190(N), respectively. As described previously herein, the default control buses 218(1)-218(N) are determined by the pad tie-offs 210(1)-210(N), respectively. In some alternate embodiments, the rail decoupling circuits 170(1)-170(N) can provide default values to the control inputs of the I/O pad circuits 190(1)-190(N), respectively, in any technically feasible fashion.

At step 406, the core voltage rail 112 and the I/O voltage rail 116 power up or power down in any order without perturbing the I/O pad circuits 190(1)-190(N). At step 408, if the power mode circuit 160 determines that the always on voltage rail 114 is powering down, then the method 400 terminates. If, however, at step 408, the power mode circuit 160 determines that the always on voltage rail 114 is not powering down, then the method 400 proceeds directly to step 410.

At step 410, the power mode circuit 160 determines that the chip reset 118 is de-asserted and, in response, sets the power mode bus 168 to specify a functional mode. At step 412, based on the power mode bus 168, the rail decoupling circuits 170(1)-170(N) provide the functional control buses 138'(1)-138'(N), respectively to the control inputs of the I/O pad circuits 190(1)-190(N), respectively. As described previously herein, the functional control buses 138'(1)-138'(N) originate in the core power domain 120.

At step 414, the power mode circuit 160 determines that the chip reset 118 is re-asserted and, in response, sets the power mode bus 168 to specify a default mode. The method 400 then returns to step 404, where the power mode circuit 160 and the rail decoupling circuits 170(1)-170(N) continue to control the I/O pad circuits 190(1)-190(N) during power sequencing. The method 400 continues to cycle through steps 404-414, until the power mode circuit 160 determines, at step 408, that the always on voltage rail 114 is powering down. The method 400 then terminates.

In sum, the disclosed techniques can be used to allow for an I/O voltage rail of an integrated circuit to be powered-up and powered-down independently of a core voltage rail without negatively impacting the integrated circuit. In some embodiments, an always on voltage rail powers a power mode circuit and a different rail decoupling circuit for each I/O pad circuit that is powered by the I/O voltage rail. When the power mode circuit is powered-up, the power mode circuit generates a power mode bus. If the chip reset signal is asserted, then the power mode circuit specifies a default mode via the power mode bus. If the chip reset signal is de-asserted, then the power mode circuit specifies a functional mode via the power mode bus. If the power mode bus specifies the default mode, then each of the rail decoupling circuits drives the control inputs of the associated I/O pad circuit based on associated pad tie-offs. For each of the rail decoupling circuits, the associated pad tie-offs specify default values for the control inputs of the associated I/O pad circuit. If, however, the power mode bus specifies the functional mode, then each of the rail decoupling circuits drives the control inputs of the associated I/O pad circuit based on a functional control bus that is associated with the I/O pad circuit. Each of the functional control buses is received from a different pad control circuit that is powered by the core voltage rail.

At least one technical advantage of the disclosed techniques relative to the prior art is that, with the disclosed techniques, the rail decoupling circuits decouple the I/O pad circuits from the core voltage rail during power sequencing. Because the control inputs of the I/O pad circuits are provided by pad tie-offs instead of potentially unpowered core circuits during power sequencing, the I/O pad circuits are associated with neither functional nor reliability issues irrespective of the order in which the core voltage rail and the I/O voltage rail power up or power down. As a result, the cost, the design complexity, and the amount of time required to incorporate the integrated circuit into a platform are reduced relative to prior-art techniques that rely on the platform designers to ensure the I/O pad circuits are properly controlled during power sequencing. In that regard, because the power mode circuit and the rail decoupling circuits automatically ensure that the I/O pad circuits are properly controlled during power sequencing, the likelihood that the I/O pad circuits compromise the integrated circuit are reduced relative to prior-art techniques that are susceptible to human error. These technical advantages provide one or more technological improvements over prior art approaches.

Any and all combinations of any of the claim elements recited in any of the claims and/or any elements described in this application, in any fashion, fall within the contemplated scope of the embodiments and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for controlling input/output ("I/O") pad circuits of an integrated circuit that includes a plurality of power domains, the method comprising:
   receiving, in a first power domain included in the plurality of power domains,
      a first signal that indicates one of,
         a first mode indicating that at least one of a second power domain or third power domain included in the plurality of power domains is powered down, or
         a second mode indicating that both the second power domain and the third power domain are powered up,
      a second signal indicating a default value for driving a first I/O pad circuit included in the second power domain, and
      a first functional control signal;
   in response to the first signal indicating the first mode, driving a first control input of the first I/O pad circuit based on the second signal instead of the first functional control signal;
   and
   in response to the first signal indicating the second mode, driving the first control input of the first I/O pad circuit based on the first functional control signal instead of the second signal.

2. The method of claim 1, wherein the first signal comprises a chip reset signal that is received via an external pin of the integrated circuit, and determining that the integrated circuit is associated with the first mode comprises determining that the chip reset signal is asserted.

3. The method of claim 1, wherein the default value is specified via a pad tie-off that is associated with the first I/O pad circuit.

4. The method of claim 1, wherein the first signal comprises a chip reset signal, and a transition of the first signal comprises a de-assertion of the chip reset signal.

5. The method of claim 1, wherein driving the first control input of the first I/O pad circuit based on the default value comprises indicating the first mode via a select input of a multiplexer, wherein the multiplexer drives the first control input of the first I/O pad circuit based on the default value when the select input indicates the first mode.

6. The method of claim 1, wherein driving the first control input of the first I/O pad circuit based on the first functional control signal comprises indicating the second mode via a select input of a multiplexer, wherein the multiplexer drives the first control input of the first I/O pad circuit based on the first functional control signal when the select input indicates the second mode.

7. The method of claim 1, wherein the first I/O pad circuit is associated with at least one of an input pad, an output pad, or a bidirectional pad of the integrated circuit.

8. The method of claim 1, wherein the first power domain comprises an always on power domain, the second power domain comprises an I/O power domain, and the third power domain comprises a core power domain.

9. The method of claim 1, further comprising driving a second control input of a second I/O pad circuit based on a second default control value in response to determining that the integrated circuit is associated with the first mode.

10. The method of claim 1, further comprising driving a second control input of a second I/O pad circuit based on a second functional control signal in response to determining that the integrated circuit is associated with the second mode.

11. A rail decoupling circuit that is included in an integrated circuit and that:
   receives, in a first power domain included in a plurality of power domains,
      a first signal that indicates one of,
         a first mode indicating that at least one of a second power domain or third power domain included in the plurality of power domains is powered down, or
         a second mode indicating that both the second power domain and the third power domain are powered up,
      a second signal indicating a default value for driving a first I/O pad circuit included in the second power domain, and
      a first functional control signal;
   in response to the first signal indicating the first mode, drives a control input of the first I/O pad circuit based on the second signal instead of the first functional control signal; and
   in response to the first signal indicating the second mode, drives the control input of the first I/O pad circuit based on the first functional control signal instead of the second signal.

12. The rail decoupling circuit of claim 11, wherein the first signal is received from a power mode circuit that determines the first signal based on a chip reset signal.

13. The rail decoupling circuit of claim 11, wherein the default value is specified via a pad tie-off that is associated with the first I/O pad circuit.

14. The rail decoupling circuit of claim 11, wherein the rail decoupling circuit drives the control input of the first I/O pad circuit based on the default value by indicating the first mode via a select input of a multiplexer, wherein the multiplexer drives the control input of the first I/O pad circuit based on the default value when the select input indicates the first mode.

15. The rail decoupling circuit of claim 11, wherein the rail decoupling circuit drives the control input of the first I/O pad circuit based on the first functional control signal by indicating the second mode via a select input of a multiplexer, wherein the multiplexer drives the control input of the first I/O pad circuit based on the first functional control signal when the select input indicates the second mode.

16. The rail decoupling circuit of claim 11, wherein the first I/O pad circuit is associated with at least one of an input pad, an output pad, or a bidirectional pad of the integrated circuit.

17. The rail decoupling circuit of claim 11, wherein the first power domain comprises an always on power domain, the second power domain comprises an I/O power domain, and the third power domain comprises a core power domain.

18. A system, comprising:
   a voltage source that generates a plurality of voltage rails; and
   an integrated circuit coupled to a power management unit that:
      receives, in a first power domain included in a plurality of power domains,
         a first signal that indicates one of,
            a first mode indicating that at least one of a second power domain or third power domain included in the plurality of power domains is powered down, or
            a second mode indicating that both the second power domain and the third power domain are powered up,
         a second signal indicating a default value for driving a first I/O pad circuit included in the second power domain, and
         a first functional control signal;
      in response to the first signal indicating the first mode, drives a control input of the first I/O pad circuit based on the second signal instead of the first functional control signal; and
      in response to the first signal indicating the second mode, drives the control input of the first I/O pad circuit based on the first functional control signal instead of the second signal.

19. The system of claim 18, wherein the default value is specified via a pad tie-off that is associated with the first I/O pad circuit.

20. The system of claim 18, wherein the first signal comprises a chip reset signal that is received via an external pin of the integrated circuit.

* * * * *

UNITED STATES PATENT AND TRADEMARK OFFICE
CERTIFICATE OF CORRECTION

PATENT NO. : 11,294,441 B2
APPLICATION NO. : 16/912539
DATED : April 5, 2022
INVENTOR(S) : Mavila et al.

It is certified that error appears in the above-identified patent and that said Letters Patent is hereby corrected as shown below:

In the Claims

Column 17, Claim 9, Line 3, please delete "control".

Signed and Sealed this
Twenty-eighth Day of June, 2022

Katherine Kelly Vidal
*Director of the United States Patent and Trademark Office*